United States Patent [19]
Bridger, Jr.

[11] 3,797,418
[45] Mar. 19, 1974

[54] MINIMUM TILLAGE PLANTER

[76] Inventor: Floyd R. Bridger, Jr., P.O. Box 836, Jonesboro, Ark. 72203

[22] Filed: Feb. 22, 1972

[21] Appl. No.: 227,732

Related U.S. Application Data
[63] Continuation-in-part of Ser. No. 16,468, March 4, 1970, abandoned.

[52] U.S. Cl. .................................. 111/73, 111/85
[51] Int. Cl. ................................................ A01c 5/06
[58] Field of Search ............ 111/85, 86, 73, 59, 79, 111/80; 172/443, 483, 699

[56] References Cited
UNITED STATES PATENTS
| | | | |
|---|---|---|---|
| 2,739,549 | 3/1956 | Taylor | 111/73 X |
| 2,885,978 | 5/1959 | Miller | 111/85 X |
| 3,219,000 | 11/1965 | Leach et al. | 111/85 X |
| 1,921,885 | 8/1933 | Kreigbaum et al. | 111/73 |
| 2,694,356 | 11/1954 | Haas | 172/483 |
| 2,357,760 | 9/1944 | Peacock | 111/73 X |
| 2,551,870 | 5/1951 | Bridger | 172/443 |
| 3,122,111 | 2/1964 | Taylor, Sr. | 111/85 X |
| 3,581,685 | 6/1971 | Taylor | 111/7 |

Primary Examiner—Stephen C. Pellegrino
Attorney, Agent, or Firm—John R. Walker, III

[57] ABSTRACT

A device used to plant seeds into soil or sod which received no prior breaking or preparation, i. e., plowing, disking, or the like. The apparatus includes a unique, forward-orientated disk coulter, an intermediate-oriented seed opener which allows for uniform depth seed placement, a rearward orientated fertilizer opener for placing fertilizer into the sod opening a distance from each side of the placed seeds and a pair of trailing press drive wheels for driving the seed and fertilizer agitators and for pressing the sod substantially back to its original density, thus assuring positive seed to soil contact.

5 Claims, 18 Drawing Figures

INVENTOR.
FLOYD R. BRIDGER, JR.
BY John R. Walker, III
Attorney

INVENTOR.
FLOYD R. BRIDGER, JR.
BY John R. Walker, III
Attorney

MINIMUM TILLAGE PLANTER

CROSS REFERENCE TO RELATED APPLICATION

This is a continuation-in-part of my copending application Ser. No. 16,468, now abandoned entitled MINIMUM TILLAGE PLANTER, filed Mar. 4, 1970.

BACKGROUND OF THE INVENTION

1. Field of the Invention

The apparatus of the present invention pertains to the field of agricultural planting and more particularly to a device which is used to plant seeds into sod which receives no prior breaking or preparation, i. e., plowing, disking or the like.

2. Description of the Prior Art

The technique of minimum tillage planting is rapidly becoming more prevalent in many geographic areas. Numerous advantages are gained by implementing the technique of minimum tillage planting: (a) It permits earlier planting since many tillage steps which cannot be accomplished in damp soil are eliminated; (b) it obviates moisture evaporation prevalent with conventional planting techniques involving plowing or disking; (c) it aids in soil conservation by obviating a tendency for erosion experienced with conventional planting techniques; (d) a considerable savings of time and effort are realized. Minimum tillage planting is particularly beneficial in areas which are subject to the hazards of erosion and/or drought.

With the advent of this new technique came several problems, some of which are: (a) the planter units must be extremely heavy to effect adequate soil penetration in adverse conditions; (b) difficulty was experienced in effecting proper seed coverage in certain soil; (c) the planting depth of the seed could not be accurately controlled; (d) minimum tillage planters heretofore disturbed the sod excessively, thus when planting in pasture-type soils, objectionable erosion was highly probable; (e) the extremely heavy planter units required a tractor having relatively high horsepower.

Patents on planters known by the applicant to exist are: the Goolsby U.S. Pat. No. 2,719,498; the Taylor U.S. Pat. No. 2,739,549; the Whelchel U.S. Pat. No. 3,200,778; the Leach et al. U.S. Pat. No. 3,219,000; the Taylor, Sr., U.S. Pat. No. 3,122,111; the Boynton U.S. Pat. No. 230,733; the Crane U.S. Pat. No. 555,897; the Bushness Patent No. 1,031,167; the Linkogel Patent No. 2,887,075; the McLeod U.S. Pat. No. 2,924,189; the Morris U.S. Pat. No. 3,131,657; and my U.S. Pat. No. 2,551,870. The Goolsby U.S. Pat. No. 2,719,498 pertains to transplanting of young plants into previously prepared soils by persons riding on the planter and holding the root of the plant in the trenches made by the planter. The Taylor U.S. Pat. No. 2,739,549 is intended for use in the cultivation and fertilization of pastureland and breaks the ground in a manner similar to a conventional plow, thus forming a furrow for depositing the seeds. The Whelchel U.S. Pat. No. 3,200,778 also has a sweep which penetrates the earth, loosening and aerating the soil, forming an open furrow for depositing the seed. The Leach et al. U.S. Pat. No. 3,219,000 is intended for use in previously prepared soil and also makes a furrow to receive the seeds. This invention U.S. Pat. No. 3,219,000 concentrates on accuracy of seed placement, i. e., having disks which are arranged to drop groups of five seeds into the furrow in an extremely accurate manner and without substantially twisting, rolling, or bouncing the seed, since the seeds are pelleted and are provided with a coating of inert material to form a hard, relatively round and smooth surface. The Taylor, Sr., U.S. Pat. No. 3,122,111 has a unique coulter and an earth-opening incisor which also makes for depositing the seed. None of the above patents disclose the principle of burrowing a delta-winged seed opener share which lifts and separates the earth without making a furrow and other features of the present invention yet to be disclosed.

SUMMARY OF THE INVENTION

The present invention is directed towards overcoming the heretoforementioned and other disadvantages of minimum tillage planters. The single row minimum tillage planter of the present invention includes a unique forward-orientated disk coulter having a depth gauge band which rides on the surface of the earth accurately regulating the planting depth, a delta-wing-shaped seed opener share having a negative dihedral angle, a unique minimum tillage fertilizer opener contiguously mounted aft of the seed opener having winglike members forming planar continuations of the wing portions of the seed opener, a pair of lower orientated winglike members which act as a shield to keep the fertilizer from dropping directly onto the seed, and a pair of trailing press drive wheels for driving the seed and fertilizer agitators and press the sod substantially back to its original density, thus assuring positive seed to soil contact. The planter of the present invention is mounted in a typical manner to the typical pull bar having the three-point hitch attached to the rear of a farm tractor, like that disclosed in my U.S. Pat. No. 2,551,870. A plurality of planter units of the present invention may be mounted side by side to the one tool bar so as to plant multiple rows simultaneously.

The unique design of the seed opener share enables the planter of the present invention to penetrate the toughest of soils in extremely trashy conditions. This obviates the necessity to add weight to the planter, e. g., water containers, in order to effect the required penetration which greatly reduces the horsepower requirements of the tractor. In other words, a typical tractor heretofore would be capable of pulling considerably fewer planter units, thus fewer rows were planted simultaneously. Another feature of the present invention is that the seed opener does not disturb the soil except in the seed zone, giving excellent seed coverage and seed-to-seed soil contact, conserving moisture, and helping prevent soil erosion. Further, the planting depth is accurately regulated and may be changed easily to any one of a number of depths by adjusting the front depth gauge coulter. Thus, a uniform and constant planting depth is maintained throughout the field, assuring uniform plant emersion. Additional features of the present planter are: (a) When planting in pasture-type soils, the sod is gently lifted, the seed and fertilizer are placed at the optimum depth, the sod is lowered back in place leaving a barely visible incision; (b) the planter unit is extremely sturdy but does not have any unnecessary weight, therefore, the pulling horsepower requirement is greatly reduced.

DESCRIPTION OF THE PREFERRED EMBODIMENT

The single row minimum tillage planter of the present invention character referenced by the numeral 11 comprises, in general, a supporting frame 13 supported aft by a pair of trailing press drive wheels 15 incorporating a drive sprocket 17 on the one side for driving a seed agitator means 19 associated with a seed hopper 21 and a sprocket 18 on the other side for driving a fertilizer agitator means 23 associated with a fertilizer hopper 25. The above description of the frame 13, wheels 15, hoppers 21, 25, etc., is deemed sufficient since they form no part of the present invention but may be of any suitable construction, e. g., like that shown in the Taylor, Sr., U.S. Pat. No. 3,122,111, issued Feb. 25, 1964.

The planter 11 of the present invention also includes a flexible attaching assembly 27 which is an improvement over my U.S. Pat. No. 2,551,870, issued May 8, 1951. The method used to enable a plurality of single row planters to be attached to the rear supporting structure of a tractor will not be disclosed since it forms no part of the present invention, but may be of any suitable construction, e. g., like that shown in my U.S. Pat. No. 2,551,870. However, it should suffice to say that the direction of travel is indicated by the arrow 28.

From FIGS. 1 – 5 of the drawings, it may be seen that the planter 11 includes a unique disk-shaped coulter 29, formed from steel plate or the like, comprising an annular disk 31 having a knife-like circumferential edge 31', a pair of concentric depth gauge bands 33, 35 and a concentric hub and bearing assembly 37. The hub assembly 37 being centered in a concentric aperture in the disk 31 is fixedly attached thereto as by welding or the like, as best viewed in FIG. 5. The depth gauge bands 33, 35, having a plurality of gussets 39 and supporting members 41 fixedly attached thereto as by welding or the like, are removably attached concentrically to the disk 31 in a typical manner, e. g., bolts-nuts 43 through suitable apertures in the disk 31, as best viewed in FIGS. 4 and 5.

The forward end of the frame 13 is supported by a bifurcated trunion assembly 45 (FIG. 2) formed from steel plate or the like, having the coulter 29 axially attached at the lower end thereof with an axle bolt-nut 47 inserted through the hub assembly 37 and suitable apertures in the trunion assembly 45. The assembly 45 is pivotally attached at the upper end thereof to each side of the frame 13 by a pair of bolt-nuts 49 inserted through suitable apertures in the frame 13 and the trunion assembly 45. A chamfered lug 51, being fixedly attached as by welding or the like intermediate the trunion assembly 45, has a depth gauge band adjustment member 53 pivotally attached thereto with a bolt-nut 55 inserted through suitable apertures in the lug 51 and adjustment member 53, as best viewed in FIG. 1. The elongated adjustment member 53, being formed from steel plate or the like, is provided with a plurality of adjustment apertures 57. A bolt-nut 59 (FIG. 2), inserted through an appropriate aperture 57 and a suitable aperture in the frame 13, rigidly secures the trunion assembly 45 in the desired position, which will be more meaningful when the remaining structure has been disclosed.

The planter 11 also includes a seed opener share 61, formed from plate steel or the like, which has a substantial vertically positioned upper portion and a delta-wing-like lower portion on either side thereof having a negative dihedral angle.

Figure 6:
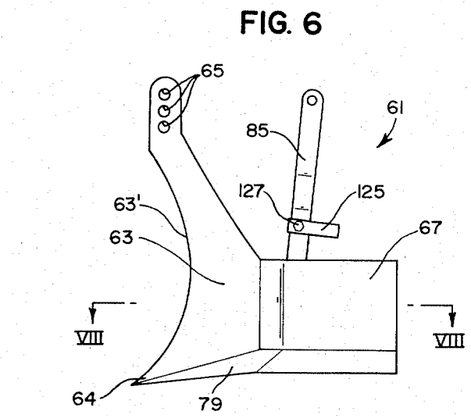
FIG. 6 is an enlarged side elevational view of the principal embodied seed opener share.
Figure 7:
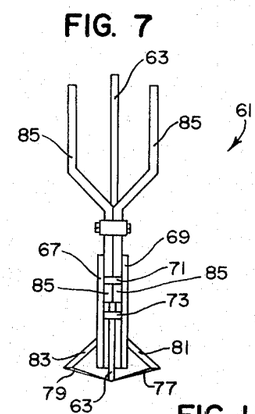
FIG. 7 is an enlarged view of the principal embodied seed opener share as taken from the rear.
Figure 8:
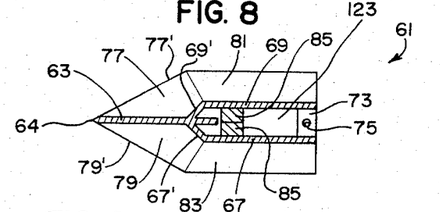
FIG. 8 is a sectional view taken as on the line VIII—VIII of FIG. 6.

Referring now to FIGS. 6, 7, 8, the upper portion of the seed opener 61 comprises a forward platelike member 63, having an arcuate knifelike leading edge 63', terminating in a point 64 at the lower forward end thereof, and having at least two apertures 65 adjacent the uppermost portion thereof; and a pair of parallel spaced apart platelike rearward vertical members 67, 69, respectively having forwardly converging portions 67', 69' fixedly attached at the forward ends thereof to the member 63 as by welding or the like. The platelike members 67, 69 straddle a pair of horizontally disposed platelike members 71, 73 (FIG. 7) integrally fused as by welding or the like to the platelike members 67, 69. The members 71, 73 are provided with aligned apertures 75 (FIG. 8) and support a minimum tillage fertilizer opener in a manner yet to be disclosed.

The forward lower portion of the seed opener 61 comprises a pair of diamond-shaped leading edge members 77, 79 which are positioned in an angled abutting relationship and being fixedly attached one to the other as by welding or the like. More specifically, the members 77, 79 are canted downwardly about two axes: First, outwardly from the abutting sides thereof; secondly, forwardly towards the termini thereof which are adjacent the point 64 of the platelike member 63. Further, the lower edge of the member 63 is disposed in abutting relationship with the abutting sides of the members 77, 79 and is fixedly attached thereto as by welding or the like.

The lower portion of the seed opener 61 also comprises a pair of winglike members, i. e., a right wing 81 and a left wing 83. The wings 81, 83 are positioned with the longitudinal axes thereof being substantially horizontal or parallel to the longitudinal axes of the members 67, 69. The wing 81 extends outwardly and downwardly from the member 69 having the inner edge thereof abuttingly engaging the member 69 and is fixedly attached thereto as by welding or the like. The forward edge of the wing 81 abuttingly engages a corresponding dimensioned rearward edge of the member 77 and is fixedly attached thereto as by welding or the like. The wing 83 is positioned and attached on the left side of the seed opener 61 in corresponding like manner as above described for the wing 81 so that the wings 81, 83 may be described as having a negative dihedral angle with the trailing edges thereof being flush with the rearmost edges of the members 69, 67 respectively.

The members 67, 69 straddle the joined portions share a substantially vertically disposed bifurcated rear support member 85 which is integrally fused and attached as by welding or the like, to the members 67, 69 substantially as shown in FIGS. 6, 7. The seed opener share 61 is removably secured rearwardly by the support member 85 being attached to the frame 13 of the planter 11 by a pair of bolts-nuts 87, 89 (FIG. 2) inserted through suitable apertures adjacent the uppermost end of the bifurcated member 85 and suitably aligned apertures in the frame 13. The seed opener sshare 61 is supported forwardly to the frame 13 by a bolt-nut 91 (FIG. 2) inserted through an appropriate aperture 65 of the forward member 63 and a suitable aligned aperture in the frame 13.

Figure 9:
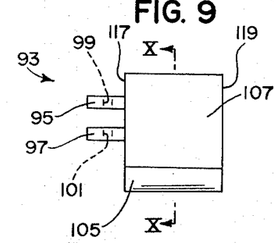
FIG. 9 is an enlarged side elevational view of the minimum tillage fertilizer opener.
Figure 10:
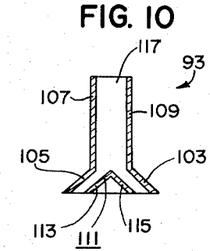
FIG. 10 is a sectional view taken as on the line X—X of FIG. 9.

The planter 11 also includes a minimum tillage fertilizer opener 93, best viewed in FIGS. 9, 10. The fertilizer opener 93, having a boxlike structure formed from plate steel or the like, has dimensions and appearance similar to the aft portion of the seed opener share 61. Intermediate the forward side of the fertilizer opener 93 is a pair of horizontally disposed protruding parallel spaced apart attaching lugs 95, 97, having apertures 99, 101 respectively. The attaching lugs 95, 97, being positioned on the fertilizer opener 93 substantially as viewed in FIG. 9, i. e., the plates 71, 73 having a suitable spaced apart distance so they may straddle the lugs 95, 97, are attached thereto as by welding.

Figure 1:
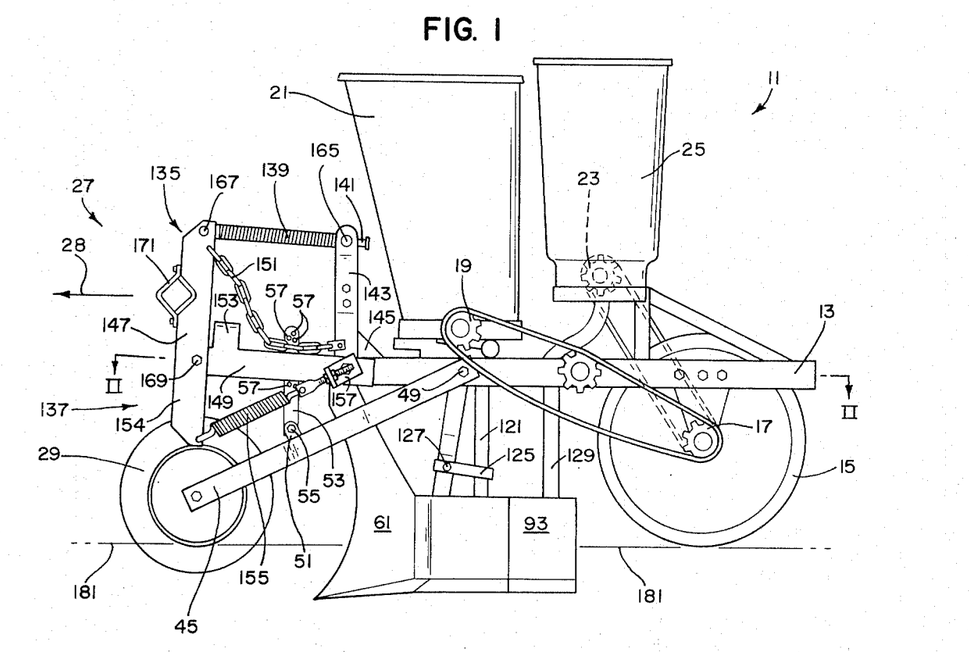
FIG. 1 is a side elevational view of the planter of the present invention.
Figure 2:
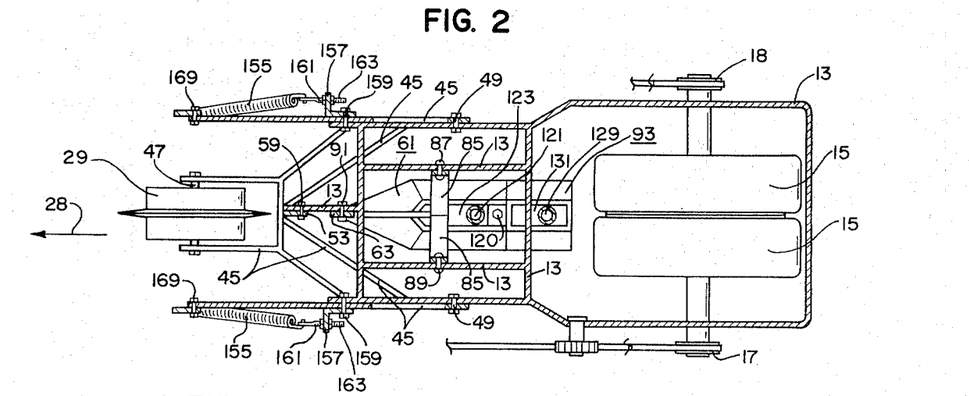
FIG. 2 is a sectional view taken as on the line II—II of FIG. 1.

The fertilizer opener 93 also includes a pair of winglike members 103, 105 which extend the length thereof and have a dihedral angle corresponding to that of the members 81, 83 so that when the fertilizer opener 93 is placed in position as shown in FIGS. 1, 2, the respective plane of the wings 103, 105 is flush with the winglike members 81, 83 of the seed opener 61. Additionally, a pair of sides 107, 109 of the fertilizer opener 93 are included which are also flush with the respective platelike members 67, 69 of the seed opener 61. A bottom 111 of the fertilizer opener 93 is also included and, being formed from plate steel or the like, has an elongated inverted V-shape thereto comprising left and right platelike member 113, 115 respectively having a parallel spaced apart relationship with the wing member 105, 103, thus forming a Y-branch, as best viewed in FIG. 10. The bottom 111 acts as a shield by deflecting the fertilizer to either side, thus preventing fertilizer from dropping directly onto the seed. Front and rear ends 117, 119 of the fertilizer opener 93 are also included and respectively have parallel sides which extend downwardly, terminating at an inverted V-shaped end which abuttingly engages the bottom 111. The bottom 111 is attached to the lowermost portions of the front and rear ends 117, 119, as by welding or the like. The fertilizer opener 93 is removably attached to the seed opener 61 (see FIGS. 1, 2) by a vertically disposed bolt-nut 120 inserted through the two apertures 75 in the members 71, 73 of the seed opener 61 and through the apertures 99, 101 in the lugs 95, 97 of the fertilizer opener 93.

Referring now to FIGS. 1, 2, an elongated tubular seed chute 121 extends from the seed hopper 21 downwardly terminating at a cavity 123 (FIG. 8) of the seed opener 61 and is secured to the support member 85 by a typical clevis 125 and clevis bolt 127. An elongated tubular fertilizer chute 129 extends from the fertilizer hopper 25 downwardly terminating at the cavity 131 of the fertilizer opener 93.

The flexible attaching assembly 27 includes an identical pair of upper assemblies 135 and an identical pair of lower assemblies 137. FIG. 1 shows the left upper assembly 135 and the left lower assembly 137 and it should be understood that identical structure for the right side exists and is obscured from view in FIG. 1. A disclosure of the left upper assembly 135 and lower assembly 137 should be construed to include the corresponding identical structure of the right side.

The upper assembly 135 comprises a compression spring 139 convolutely encircling a pushrod 141, a fixed vertical member 143 secured by a gusset 145 to the frame 13, a pivotally attached vertical member 147, a pivotally attached horizontal member 149, an elongated flexible member 151, as a chain or the like, and a forward transversal member 153, all of which are fully disclosed in my U.S. Pat. No. 2,551,870.

The lower assembly 137 comprises a downward extending portion 154 of the above-mentioned vertical member 147 having a pull spring 155 swingingly secured to an aperture suitably located at the lowermost portion thereof, a right angle bracket 157 having one face portion pivotally attached through a suitable aperture therein with a bolt-nut 159 to the frame 13 and an eye-bolt 161 having the spring 155 swingingly secured to the eye portion thereof with the threaded shank portion 163 extending through a suitable aperture in the other face portion of the bracket 157 and secured therethrough by a pair of jam nuts, one on either side. The elongated threaded shank portion 163 may be moved in and out of the aforementioned aperture by sequentially rotating the jam nuts to infinite positions, thus serving as an adjustment for increasing or decreasing the spring tension on the spring 155. Increasing the spring tension on the spring 155 urges the forward portion of the frame 13 downward since the horizontal member 149 pivots about the bolt 159. Thus, the earth engaging pressure of the coulter 29 may be adjusted independent of the earth engaging pressure of the press wheels 15.

The vertical member 143 is fixed to the frame 13, the spring 139 and rod 141 pivot about and are movable through trunion pivot pins 165, 167, the horizontal member 149 pivots about the bolt-nut 159, and the vertical member 147 pivots about the pivot pins 167, 169.

In operation, the planter 11 is attached to a typical pullbar, not shown, with a clamping device 171 and is pulled behind a typical tractor, not shown, in the direction of the arrow 28 as fully disclosed in my U.S. Pat. No. 2,551,870. It should be understood that the planter 11 and the tractor (not shown) would preferably be initially rigged on substantially level terrain, and the pullbar (not shown) is then rotated in a clockwise direction, as viewed in FIG. 1, so as to displace the rod 141 substantially as depicted in FIG. 1. The rotation of the pullbar (not shown) applies considerable torque thereto which transmits an earth engaging force to the wheels 15 obviating any skipping of the seed and fertilizer dispensing.

An important feature of the present invention is the unique design of the seed opener 61 which causes it to constantly tend to bury itself deeper into the earth when being pulled by a tractor or the like. This assures that the seed opener 61 does not float up to the surface of the earth, thus obviating any necessity to weight the planter 11 with massive structure or water containers or the like. The pitch angle of the seed opener 61 may be adjusted by inserting the bolt 91 (FIG. 2) selectively through different ones of the apertures 65 (FIG. 6) in the forward member 63 of the seed opener 61. In other words, when attached to the frame 13 through the uppermost aperture 65, the seed opener 61 has the greatest downward pitch which would be preferable when planting in loose or sandy soil. On the other hand, when planting in old pasture sod or firm clay-like soil, the pitch angle would be decreased accordingly, i. e., placed in a lower aperture 65.

As above-stated, the seed opener 61 tends to bury itself deeper into the soil, however, the depth gauge bands 33, 35 of the coulter 69 ridingly engage the surface of the earth, thus controlling the depth at which the seed opener 61 is allowed to seek. It should be understood that the knifelike edge 31' of the circular disk 31 of the coulter 21 is directly in line with the knifelike leading edge 63' of the forward member 63 of the seed opener 61.

Figure 3:
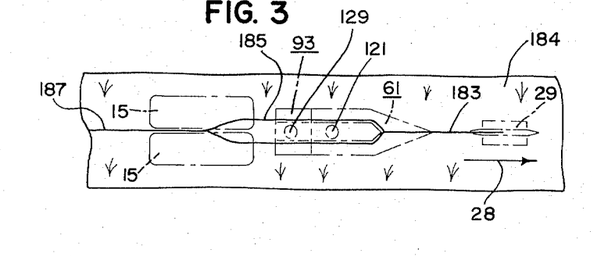
FIG. 3 is a somewhat diagrammatic plan view depicting the operative earth-engaging features of the planter and the effect that each has to the earth in accomplishing its desired purpose.
Figure 4:
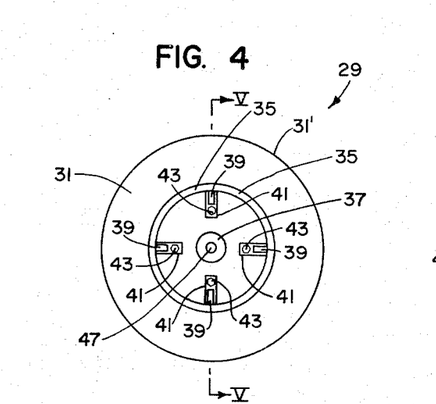
FIG. 4 is an enlarged side elevational view of the depth gauge coulter.
Figure 5:
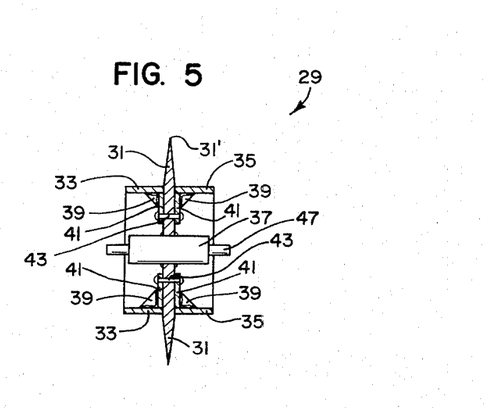
FIG. 5 is a sectional view taken as on the line V—V of FIG. 4.

Referring now to FIG. 3, as the coulter 29 rotates, it makes an incision 183 in the earth's surface 184 severing not only the earth but any trash such as dead weeds or tough grass roots or the like, thus precluding debris from accumulating on the forward member 63 of the seed opener 61. The leading edge 63' of the forward member 63 of the seed opener 61 increases the depth of the incision 183 and the downward pitch or cant of the leading edge members 77, 79 assures that the seed opener 61 will constantly tend to bury itself deeper.

More specifically, the point 64 of the member 63, being adjacent the forward most points of the diamond-shaped members 77, 79, will always be the lowest point of the seed opener 61 regardless of which one of the apertures 65 in which the bolt 91 may be placed. Therefore, the seed opener 61 will always be seeking a deeper depth, thus pulling downwardly on the coulter 29. However, the bands 33, 35 of the coulter 29 have sufficient area thereto for precluding earth penetration thereof, thus constantly controlling the depth the seed opener 61 can achieve. The canted members 77, 79 of the seed opener 61 also lift the earth and the platelike members 67, 69 of the seed opener 61 separate the earth while the wing-like member 81, 83 hold the earth at that level to which lifted by the members 77, 79, thus forming a subterranean pocket or cavity. The pocket will have a tapered bottom and top thereto, i. e., having a cross sectional shape substantially like the outermost edges of the wing-like members 81, 83 (FIG. 7) at the top thereof and like the outermost edges of the diamond-shaped members 77, 79 (FIG. 7) at the bottom thereof with the point 64 (FIG. 8) of the member 63 always forming the lowest point at the bottom of the pocket regardless of the degree of downward pitch selected.

The seeds (not shown) are moved from the hopper 21 through the chute 121 and the cavity 123 in a typical manner and are deposited into the pocket adjacent the lowest point or substantially adjacent the center thereof. The fertilizer (not shown) is moved from the hopper 25 through the chute 129 and into the fertilizer opener 93 in a typical manner and is deposited onto the inverted V-shaped bottom portion 111 thereof. The wing-like member 113, 115 prevent the fertilizer from falling directly upon the seeds, i. e., the fertilizer is deposited to either side of the pocket by the members 113, 115. The trailing press wheels 15, having considerable pressure applied through the flexible attaching assembly 27, close the separated incision 185 and press the earth substantially to its original density, thus assuring positive soil to seed contact leaving a barely visible incision 187.

The depth of the subterranean pocket may be varied by selecting the appropriate aperture 57 in the adjustment member 53. Placing the bolt 59 (FIG. 2) through the uppermost aperture 57 (FIG. 1) effectively raises the seed opener 61, accordingly, the subterranean pocket would be at its most shallow depth. The depth selected for the subterranean pocket is determined by the type of seed being planted, i. e., the optimum depth specified being preferable.

Figure 11:
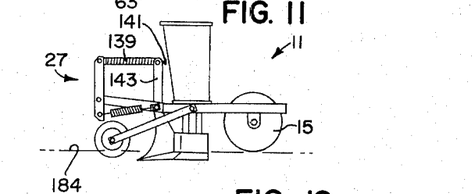
FIG. 11 is a somewhat diagrammatic elevational view depicting the action of the flexible attaching assembly when the planter of the present invention is being pulled on substantially level ground.
Figure 12:
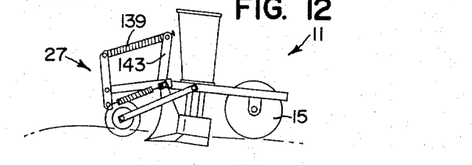
FIG. 12 is a somewhat diagrammatic elevational view depicting the action of the flexible attaching assembly when the planter of the present invention is being pulled over a hump or ridge on the surface of the earth.

Referring now to FIG. 11, the planter 11 is shown with the flexible attaching assembly 27 in a position preferred for substantially level earth 184. FIG. 12 shows the displacement of the flexible attaching assembly 27 when the tractor (not shown) encounters a depression or the like (effectively loosening the torsion on the pullbar, not shown), the compression spring 139 urges the vertical member 143 rearwardly, which in turn transmits the force to the drive wheels 15, thus obviating the possibility of skipping. It should be understood that when the tractor (not shown) encounters an incline, the opposite action takes place, i. e., the push rod 141 would be further displaced to the rear of the vertical member 143.

The portion of the present invention constituting an improvement over my invention U.S. Pat. No. 2,551,870 and comprising the lower assembly 137 of the flexible attaching assembly 27 solves the problem of the entire planter 11 being lifted when the coulter 29 encounters a rock or similar immovable high density object. The tension on the spring 155 may be adjusted by sequentially rotating the jam nuts about the eye-bolt 161, accordingly, the earth engaging pressure of the coulter 29 may be thus increased or decreased independent of the pressure on the press wheels 15. Since the horizontal member 149 pivots at the bolts 159, the stronger the tension on the spring 155, the less tendency for the front portion of the planter 11 to rise, thus lifting the coulter 29. The compression spring 139 may be compressed by tightening the torsion or rotating the pullbar (not shown) clockwise as viewed in FIG. 1 and fully disclosed in my U.S. Pat. No. 2,551,870, thus applying more earth engaging pressure to the trailing wheel 15. Increasing the tension of the springs 155 applies more earth engaging pressure to the coulter 29.

FIGS. 13 – 18 concern an alternate embodied seed opener share character referenced by the numeral 261 in the drawings. The share 261 generally includes a forward assembly 263 (FIG. 17), a rearward assembly 265 (FIG. 18), and a mounting means 267 for mounting the share 261 from the frame 13 of the planter 11, substantially in the same manner as previously disclosed for mounting the principal embodied share 61 thereto.

The forward assembly 263 includes a vertically disclosed platelike member 269 having a knifelike leading edge 271 thereto. The vertical platelike member 269 substantially accomplishes the same purpose for the share 261 as does the previously disclosed vertical platelike member 63 (FIG. 6) accomplishes for the share 61. In other words, the member 269 is spaced behind and in alignment with the annular disk 31 (FIGS. 4 and 5) for increasing the depth of the incision 183 (FIG. 3) in the ground 184.

The forward assembly 263 additionally includes an inclined concavo-convex member 273 which is fixedly attached to the vertical member 269. Additionally included is a pair of winglike members 275, 277 having the forward portions thereof fixedly attached as by welding or the like to the vertical member 269. More specifically, I prefer that the winglike members 275, 277 and the concavo-convex member 273 be integrally formed from one piece of plate steel structure having the vertical member 269 attached thereto as by welding or the like.

Figure 13:
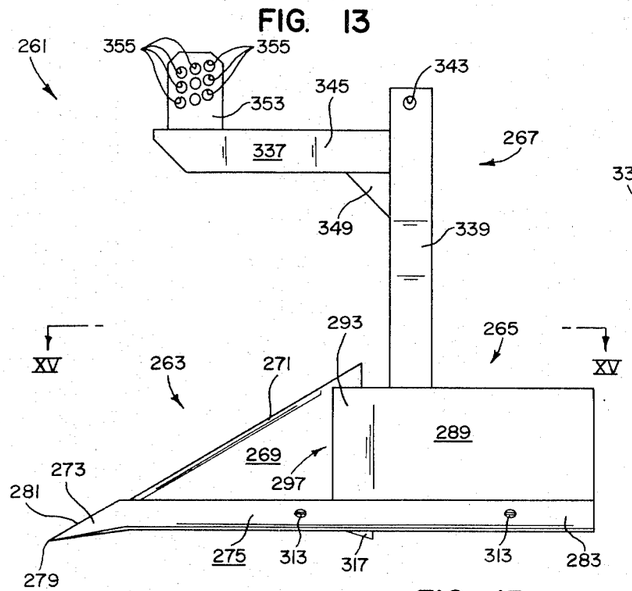
FIG. 13 is an enlarged side elevational view of an alternate embodied seed opener share.
Figure 15:
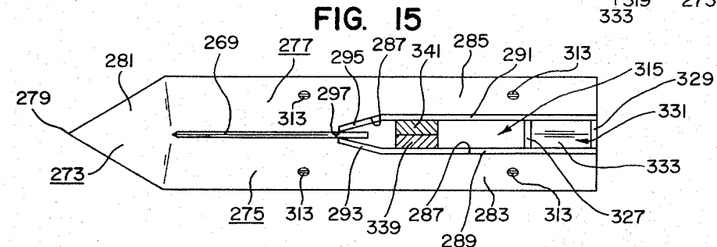
FIG. 15 is a sectional view taken as on the line XV—XV of FIG. 13.

The concavo-convex member 273 is directed downwardly and forwardly from the members 269, 275, 277 towards a pointed terminus 279 clearly shown in FIGS. 13 and 15 of the drawings. An inclined or cam surface 281 of the member 273 tends to pull the shear 261 ever deeper into the ground as the planter 11 is pulled along over the ground by a tractor (not shown) or the like. Hence, the inclined surface 281 begins the formation of a subterranean pocket in the ground for receiving seeds in a manner yet to be disclosed.

The winglike members 275, 277 slope downwardly and outwardly from the vertical member 269 for completing the formation of the subterranean pocket. The members 275, 277 respectively have spaced apart rearward extending portions 283, 285 defining a broad horizontally extending slot 287 for purposes yet to be disclosed.

The rearward assembly 265 includes a pair of laterally spaced platelike vertical members 289, 291 for spreading the ground outwardly along the incision 183 to form an opening in the ground which extends upwardly from the above described subterranean pocket. The vertical members 289, 291 are substantially identical to the vertical members 67, 69 (FIG. 8) previously described and included as structure pertaining to the principal embodied seed opener 61.

More specifically, the vertical members 289, 291 respectively have forwardly converging spaced apart margins 293, 295 thereto defining a narrow vertically extending slot 297 for receiving the rearwardmost portion of the vertical member 269 as clearly shown in FIGS. 13, 15 of the drawings. In other words, the forward assembly 263 slides onto the rearward assembly 265 and the respective rearward extending portions 283, 285 engage the vertical members 289, 291, i. e., the members 289, 291 being received in the broad horizontal slot 287, as clearly shown in FIG. 15 of the drawings.

Figure 14:
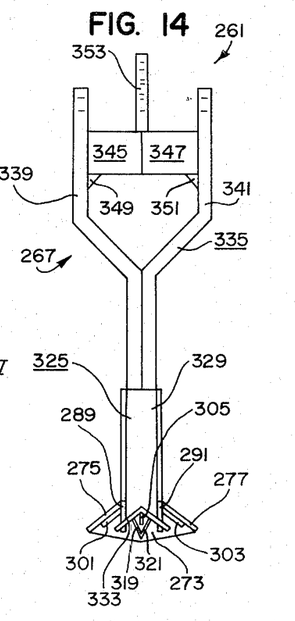
FIG. 14 is an enlarged view of the alternate embodied seed opener share as taken from the rear.

The rearward assembly 265 additionally includes a wing support member 299 which is fixedly attached to the vertical member 289, 291 in a suitable manner, as by welding or the like. The wing support member 299 includes a pair of truss portions 301, 303 which are angularly disposed one with the other substantially as depicted in FIG. 14 of the drawings, i. e., the truss portion 301 being substantially parallel with the winglike member 275 and the truss portion 303 being substantially parallel with the winglike member 277.

Figure 16:
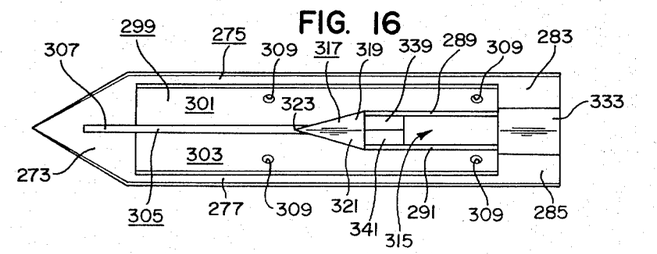
FIG. 16 is an enlarged view of the alternate embodied seed opener share as taken from below.
Figure 17:
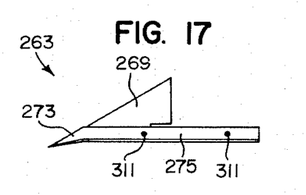
FIG. 17 is a miniaturized side elevational view of the forward section of the alternate embodied seed opener share.

From FIG. 16 of the drawings, it may be seen that the respective truss portions 301, 303 abuttingly engage the vertical members 289, 291, i. e., at least the rearward portions thereof, and are fixedly attached thereto in a suitable manner, as by welding or the like. Additionally, the forward ends of the truss portions 301, 303 extend forwardly beyond the vertical members 289, 291 in abutting relationship and are suitably attached one with the other, as by welding or the like.

Figure 18:
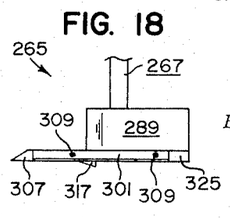
FIG. 18 is a miniaturized side elevational view of the rearward section of the alternate embodied seed opener share.

The wing support member 299 additionally includes a strong back vertical platelike portion 305 extending substantially horizontal with the aft end thereof being received in the slot 297 and being fixedly attached to the margin portions 293, 295 of the members 289, 291, as by welding. Further, the strong back portion 305 preferably is provided with a pointed forward extending portion 307, as best illustrated in FIG. 18 of the drawings. The midportion of the strong back 305 is fixedly attached, as by welding or the like, to the converging truss portions 301, 303.

It should be pointed out that the end of the pointed forward extending portion 307 abuttingly engages the concave surface of the concavo-convex member 273 to reinforce the member 273 against a rearward bending tendency thereof, as it is caused to engage the earth in a manner previously described.

A plurality of apertures 309 are provided in the truss portions 301, 303 substantially as depicted in FIG. 16 of the drawings. The winglike members 275, 277 are provided with a plurality of apertures 311 (FIG. 17) which are in alignment with the apertures 309 when the forward assembly 263 is properly fitted to the rearward assembly 265. The apertures 311 preferably are recessed for respectively receiving a plurality of flathead bolts 313 or the like. In other words, the bolts 313 extend through the apertures 311, 309 and are suitably secured in a typical manner, as with nuts (not shown) bearing against the underneath surfaces of the truss portions 301, 303, the flat heads of the bolts 313 being flush with the upper surfaces thereof.

From FIGS. 15 and 16 of the drawings, it may be seen that the spaced apart distance between the platelike members 289, 291 form a bootlike opening 315 similar to the previously described cavity 123 (FIG. 8) of the seed opener 61. In other words, the lower end of the seed chute 121 extends into the opening 315 so that seeds may be deposited therethrough and into the previously described subterranean pocket, i. e., through the opening in the ground formed by vertical members 289, 291 and in a manner as previously described.

The seed opener share 261 preferably includes a means 317 for final shaping of the bottom portion of the previously described subterranean pocket in the ground, i. e., immediately prior to the seeds being deposited therein. The final shaping means 317 includes a pair of pointed wedge-shaped platelike members 319, 321 respectively disposed subjacent the converging margin portions 293, 295 of the vertical members 289, 291, as best shown in FIGS. 14 and 16 of the drawings. The wedge-shaped members 319, 321 are further disposed in an angular abutting relationship having a V-shaped cross section thereto diminishing forwardly and upwardly and terminating at a point 323. Accordingly, the members 319, 321 are fixedly attached one to the other along the lower edges thereof and the respective upper edges thereof being fixedly attached to the margin portions 293, 295 and to the strong back portion 305, as by welding or the like.

The seed opener share 261 preferably includes a fertilizer opener as character referenced by the numeral 325 in the drawings. Accordingly, the laterally spaced vertical members 289, 291 preferably extend a distance rearwardly beyond the bootlike opening 315 as do the portions 283, 285 respectively of the members 275, 277. Thus, a divider platelike member 327 and a rearward closure platelike member 329 establish a second bootlike opening 331 for allowing fertilizer to pass therethrough in a manner yet to be described.

The members 327, 329 terminate along the lower edges thereof in an inverted V-shape which extend a predetermined distance downwardly beyond the lower edges of the members 289, 291 and the truss portions 301, 303 as shown for the member 329 in FIG. 14 of the drawings. The fertilizer opener 325 includes an inverted V-shape bottom 333 fixedly attached forwardly thereof to the divider member 327 and rearwardly thereof to the member 329 as by welding or the like, thusly establishing a Y-branch opening communicated with the opening 331, i. e., similar to the previously described fertilizer opener 93 (FIGS. 9 and 10) for the principal embodiment. More specifically, the lower end of the chute 129 (FIG. 1) is received in the opening 331 for depositing fertilizer through the opening 331 and through the Y-branch into the previously described subterranean pocket, i. e., along the outer edges thereof a distance removed from the seeds. In other words, the bottom 333 acts as a shield which covers the seeds and displaces the fertilizer being deposited through the Y-branch to either side of the pocket. It should be understood that the lower margins of the laterally spaced vertical members 289, 291 have offset portions adjacent the rearward ends thereof substantially as depicted for the platelike member 289 in FIG. 18 of the drawings. In other words, the members 289, 291 extend downwardly a distance further along the portion thereof establishing in part the opening 315, than they do along the portions establishing in part the opening 331, thus defining in part the Y-branch opening for allowing the fertilizer to be deposited therethrough. The rearward extending portions 283, 285 assure that the subterranean pocket remains open for receiving the fertilizer along the outer side thereof. Therefore, the rearward portions 283, 285 also define in part the Y-branch opening.

The cross sectional shape of the subterranean pocket formed by the share 261 is very similar to the previously described subterranean pocket for the principal embodied share 61. In other words, the floor portion of the subterranean pocket tapers downwardly to a low point adjacent the center thereof which is formed by the pointed terminus 279 of the member 273 and may finally be shaped by the final shaping means 317, depending upon the pitch of the mounting means 267 yet to be described. However, irrespective of the pitch, the seeds will always be deposited in a central valley portion of the pocket and the fertilizer will be deposited at a slightly higher elevation along the outer edges thereof.

The mounting means 267 includes a vertically disposed bifurcated assembly 335 and a horizontally disposed bifurcated assembly 337. From FIG. 14 of the drawings, it may be seen that the assembly 335 includes left and right offset members 339, 341 having the lower portions thereof contiguously engaging one another and fixedly attached one to the other as by welding or the like. Additionally, the lower ends of the members 339, 341 extend downwardly between the laterally spaced vertical members 289, 291 and are fixedly attached thereto, as by welding or the like. The upper ends of the members 339, 341 are provided with apertures 343 for receiving the pair of bolts-nuts 87, 89 (FIG. 2) which secure the vertical assembly 335 to the frame 13.

The horizontal assembly 337 includes left and right offset members 345, 347 converging forwardly having portions thereof contiguously engaging and fixedly attached one to the other, as by welding or the like. The rearward ends of the members 345, 347, having a spaced apart distance substantially equal to the spaced apart distance of the upper ends of the members 339, 341, are fixedly attached to the respective members 339, 341 as by welding or the like.

The mounting means 267 preferably includes a pair of gussets 349, 351 which are fixedly attached as by welding or the like respectively to the junction of the members 339, 345; 341, 347. The mounting means 267 additionally includes a pitch adjustment member 353 for adjusting the pitch of the inclined or cam surface 281 of the member 273. The member 353 is positioned adjacent the junction of the offset members 345, 347 substantially as depicted in FIGS. 13 and 14 of the drawings and is fixedly attached thereto as by welding or the like. The adjustment member 353 is provided with a plurality of apertures 355 for selectively receiving the bolt-nut 91 (FIG. 2) which secures the horizontal assembly 337 to the frame 13.

The share 261 incorporates the important features of the principal embodied share 61, i. e., the unique design of the share 261 causes it to constantly tend to bury itself deeper into the earth when being pulled by a tractor or the like. This assures that the share 261 does not float up to the surface of the earth, thus obviating any necessity to weight the planter 11 with massive structure or water containers or the like. The pitch angle of the share 261 may be adjusted by inserting the bolt 91 selectively through different ones of the apertures 355 in the pitch adjustment member 353. In other words, when attached to the frame 13 through the uppermost aperture 355, the share 261 has the greatest downward pitch, which would be preferable when planting in loose or sandy soil. On the other hand, when planting in old pasture sod or firm claylike soil, the pitch angle would be descreased accordingly, i. e., placed in a lower aperture 355. However, it should be pointed out that the incline surface 281 will incline downwardly and forwardly from a horizontal angle even when the bolt 91 is inserted in the lowermost aperture 355. Thusly, the cam surface 281 will always be tending to pull the share 261 deeper into the earth.

Although the invention has been described and illustrated with respect to preferred embodiments thereof, it is to be understood that it is not to be so limited since changes and modifications may be made therein which are within the full intended scope of the invention.

I claim:

1. A minimum tillage planter comprising a supporting frame, attaching means coupled to said supporting frame for attaching said planter to a tractor for travel over the ground, a coulter, means mounting said coulter forwardly and below said frame for making an incision in the ground as said frame travels over the ground, said coulter including an annular disk and a pair of gauge bands mounted on opposite sides of said disk for limiting the depth of penetration of said coulter into the ground, a seed opener share, means mounting said seed opener share from said frame; said seed opener share including a forward assembly comprising a vertically disposed platelike member having a knife-like leading edge thereto and being spaced behind and in alignment with said annular disk for increasing the depth of the incision in the ground, an inclined concavo-convex member fixedly attached to said vertical member and being directed downwardly and forwardly therefrom towards a pointed terminus thereof for tending to bury itself ever deeper into the ground thus beginning to form a subterranean pocket in the ground and applying a downward pulling force to said planter as it is caused to travel over the ground by the tractor, and a pair of wing-like members respectively being fixedly attached forwardly thereof to said vertical member and being integrally attached to said concavo-convex member, said wing-like portions sloping downwardly and outwardly from said vertical member for completing the forming of said pocket and having rearward extending portions defining a broad horizontally extending slot; a rearward assembly comprising a pair of laterally spaced platelike vertical members for spreading the ground outwardly along the incision to form an opening in the ground extending upwardly from said pocket, said vertical members having forwardly converging spaced apart margins thereto defining a narrow vertically extending slot for receiving the rearwardmost margin portion of said vertical member of said forward assembly, said broad slot of said forward assembly receiving said vertical members of said rearward assembly, and a wing support member fixedly attached to said vertical members for contiguously engaging the underside of portions of said forward assembly to support said forward assembly, said wing-like members and said wing support member being provided with aligned apertures for receiving attaching means to removably attach said forward assembly to said rearward assembly; and means for depositing seeds into said pocket through said opening in the ground.

2. The planter of claim 1 in which is included shaper means for final shaping of the bottom portion of said pocket in the ground immediately prior to the seeds being deposited therein, said shaper means including a pair of pointed wedge-shaped platelike members respectively disposed subjacent said converging margin portions of said vertical members of said rearward assembly, said wedge-shaped members being further disposed in an angled abutting relationship one with the other having the pointed portions thereof extending a spaced distance forward of said margin portions and being fixedly attached one to the other and respectively to said converging margin portions of said vertical members of said rearward assembly.

3. The planter of claim 1 in which is included a fertilizer opener means fixedly attached to said seed opener share at the rearward end thereof, and in which is included means for depositing fertilizer through said fertilizer opener means into said pocket in the ground.

4. The planter of claim 3 in which said fertilizer opener means includes fertilizer displacement means for displacing the fertilizer being deposited into said pocket a distance from the seeds being deposited therein.

5. The planter of claim 3 in which is included a pair of side-by side wheel means rotatably mounted from said frame rearwardly of said fertilizer opener means for closing said opening and said pocket in the earth formed by coulter, said seed opener share and said fertilizer opener means.

* * * * *